(12) United States Patent
Kagami

(10) Patent No.: US 12,695,163 B2
(45) Date of Patent: Jul. 28, 2026

(54) BATTERY WITH SPACER MEMBER FOR LOAD RESISTANCE

(71) Applicant: TOYOTA JIDOSHA KABUSHIKI KAISHA, Toyota (JP)

(72) Inventor: Ryo Kagami, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 478 days.

(21) Appl. No.: 18/139,654

(22) Filed: Apr. 26, 2023

(65) Prior Publication Data

US 2023/0420808 A1 Dec. 28, 2023

(30) Foreign Application Priority Data

Jun. 27, 2022 (JP) ................................. 2022-102536

(51) Int. Cl.
*H01M 50/54* (2021.01)
*H01M 50/593* (2021.01)

(52) U.S. Cl.
CPC ......... *H01M 50/54* (2021.01); *H01M 50/593* (2021.01)

(58) Field of Classification Search
CPC .. H01M 50/54; H01M 50/533; H01M 50/593; H01M 50/595; H01M 50/538
See application file for complete search history.

(56) References Cited

U.S. PATENT DOCUMENTS

| | | | | |
|---|---|---|---|---|
| 2003/0228515 A1* | 12/2003 | Woehrle | .............. | H01M 50/186 429/185 |
| 2006/0073382 A1* | 4/2006 | Urano | ................. | H01M 50/147 429/174 |
| 2007/0105015 A1* | 5/2007 | Munenaga | ........ | H01M 10/0431 429/161 |
| 2011/0117404 A1 | 5/2011 | Ahn et al. | | |
| 2011/0244312 A1* | 10/2011 | Tani | ...................... | H01M 50/54 429/163 |
| 2012/0052360 A1* | 3/2012 | Fujiwara | ........... | H01M 10/0413 429/153 |
| 2012/0202105 A1 | 8/2012 | Shinyashiki | | |

(Continued)

FOREIGN PATENT DOCUMENTS

| | | |
|---|---|---|
| JP | 2011-108623 A | 6/2011 |
| JP | 5550805 B2 | 7/2014 |

(Continued)

*Primary Examiner* — Amanda J Barrow
(74) *Attorney, Agent, or Firm* — Sughrue Mion, PLLC

(57) ABSTRACT

A battery includes an electrode body, current collector tabs, a current collector terminal, and a laminate film. Each current collector tab includes a root portion that is an end portion on the electrode body side, a connection portion for connecting to the current collector terminal, and an intermediate portion connecting the root portion and the connection portion. The current collector tabs include a laminated connection portion in which the connection portions are laminated in a thickness direction. The current collector terminal includes an inner surface facing a side surface portion of the electrode body, and a side surface disposed along an outer edge of the inner surface. The laminate film is disposed on the side surface of the current collector terminal. A main surface of the laminated connection portion is joined to the inner surface. A spacer member is disposed between the inner surface and the side surface portion.

5 Claims, 5 Drawing Sheets

(56) References Cited

U.S. PATENT DOCUMENTS

| 2016/0093840 | A1 |     | 3/2016  | Yoshino |             |
|--------------|----|-----|---------|---------|-------------|
| 2018/0145304 | A1 | *   | 5/2018  | Kogetsu | H01M 50/533 |
| 2018/0277822 | A1 | *   | 9/2018  | Minagata | H01G 11/82 |
| 2021/0083256 | A1 | *   | 3/2021  | Liu     | H01M 50/593 |
| 2022/0045408 | A1 | *   | 2/2022  | Akizuki | H01M 50/586 |
| 2023/0420809 | A1 | *   | 12/2023 | Kagami  | H01M 50/105 |
| 2025/0007134 | A1 | *   | 1/2025  | Li      | H01M 10/4235 |

FOREIGN PATENT DOCUMENTS

| JP | 2016-66519    | A  |   | 4/2016  |             |
|----|---------------|----|---|---------|-------------|
| JP | 2018-181622   | A  | * | 11/2018 | H01M 10/04  |
| JP | 2020-115423   | A  |   | 7/2020  |             |
| WO | WO2008/010656 | A1 |   | 1/2008  |             |

* cited by examiner

FIG. 3A
FIG. 3B
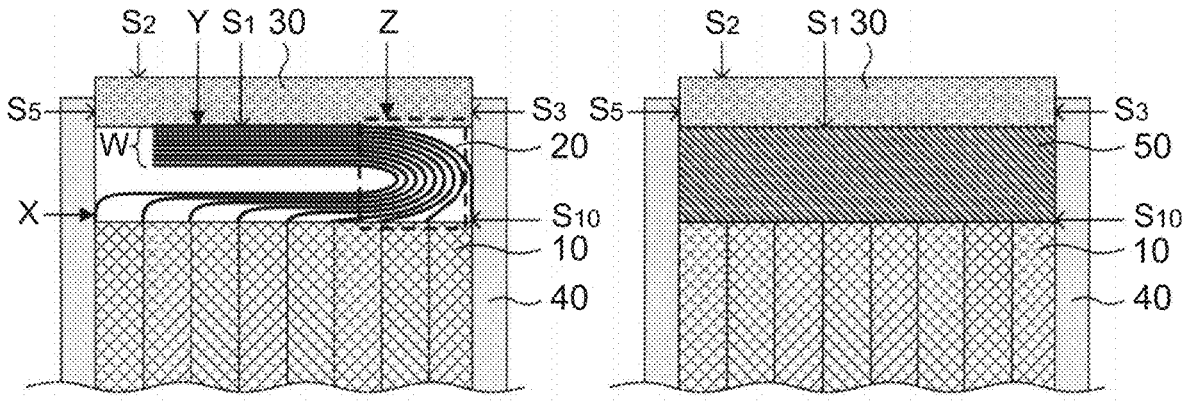
FIG. 4A
FIG. 4B
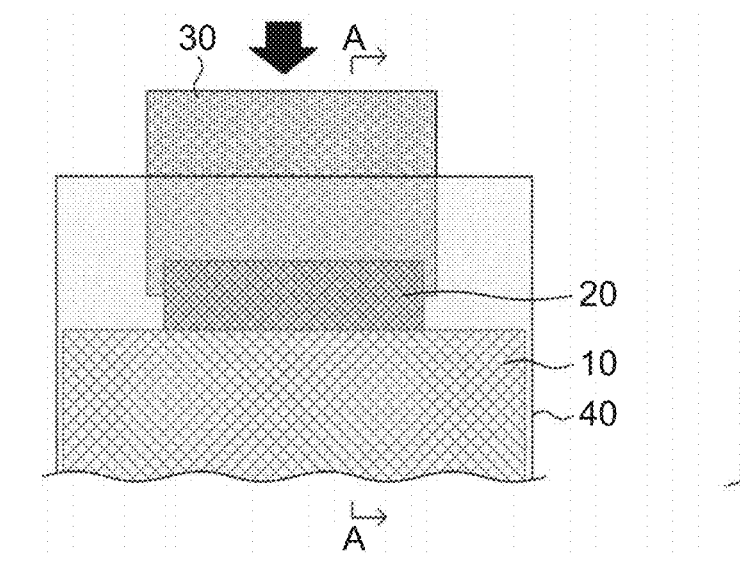
FIG. 5A
FIG. 5B
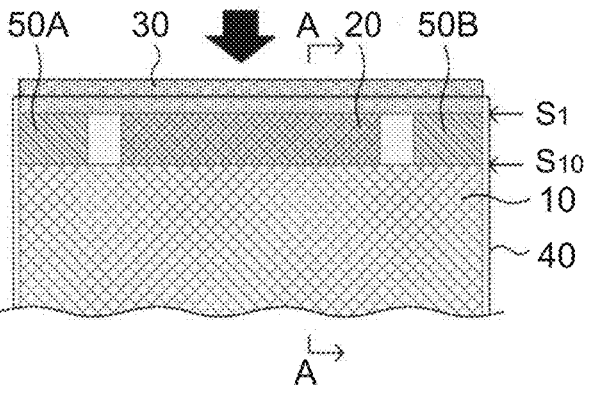
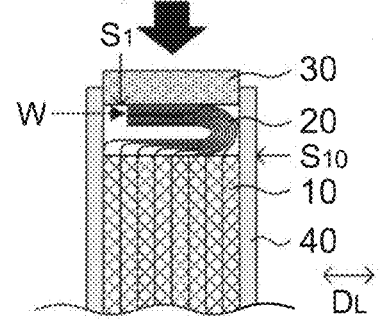

BATTERY WITH SPACER MEMBER FOR LOAD RESISTANCE

CROSS-REFERENCE TO RELATED APPLICATION

This application claims priority to Japanese Patent Application No. 2022-102536 filed on Jun. 27, 2022, incorporated herein by reference in its entirety.

BACKGROUND

1. Technical Field

The present disclosure relates to a battery.

2. Description of Related Art

A battery such as a lithium ion secondary battery generally includes an electrode body having a positive electrode current collector, a positive electrode active material layer, an electrolyte layer, a negative electrode active material layer, and a negative electrode current collector. The electrode body is sealed with an exterior body. Electricity generated in the electrode body is led out from the inside of the exterior body to the outside thereof by a current collector terminal. For example, Japanese Patent No. 5550805 (JP 5550805 B) discloses a stacking or stacking/folding type electrode assembly of a positive electrode/separator/negative electrode structure. Also, FIG. 2 of JP 5550805 B discloses that multiple tabs (e.g., positive electrode tabs 40) are combined in a closely spaced configuration and connected to a lead (e.g., positive electrode lead 60). Furthermore, JP 5550805 B discloses that a laminate sheet (laminate film) is used as an exterior body. Similarly, Japanese Unexamined Patent Application Publication No. 2011-108623 (JP 2011-108623 A) and Japanese Unexamined Patent Application Publication No. 2020-115423 (JP 2020-115423 A) also disclose the use of a laminate film as an exterior body.

SUMMARY

A battery using a laminate film is weak against a load in a direction in which a current collector terminal is pushed toward an electrode body side, and when such a load is applied to the battery, the laminate film is likely to be damaged.

The present disclosure has been made in view of the above circumstances, and a main object thereof is to provide a battery in which the laminate film is less likely to be damaged even when a load is applied to the battery in the direction in which the current collector terminal is pushed toward the electrode body side.

(1)

A battery includes: an electrode body; a plurality of current collector tabs extending from a side surface portion of the electrode body; a current collector terminal connected to the current collector tabs; and a laminate film housing the electrode body and the current collector tabs. Each of the current collector tabs includes a root portion that is an end portion on the electrode body side, a connection portion for connecting to the current collector terminal, and an intermediate portion connecting the root portion and the connection portion. The current collector tabs include a laminated connection portion in which the respective connection portions of the current collector tabs are laminated in a thickness direction. The current collector terminal includes an inner surface facing the side surface portion of the electrode body, and a side surface disposed along an outer edge of the inner surface. The laminate film is disposed on the side surface of the current collector terminal. A main surface of the laminated connection portion is joined to the inner surface. A spacer member is disposed between the inner surface and the side surface portion.

(2)

In the battery according to (1), in a sectional view in a laminating direction of the electrode body, the intermediate portion may include a curved structure in which the intermediate portion is curved such that parts of the intermediate portion face each other.

(3)

In the battery according to (1) or (2), the spacer member may be a resin member.

(4)

In the battery according to any one of (1) to (3), the spacer member may be in contact with the inner surface and also be in contact with the side surface portion.

(5)

In the battery according to any one of (1) to (4), the battery may include a first spacer member and a second spacer member as the spacer member, and in plan view in a laminating direction of the electrode body, the current collector tabs may be arranged between the first spacer member and the second spacer member.

The present disclosure has the effect of being able to provide a battery in which the laminate film is less likely to be damaged even when a load is applied to the battery in a direction in which the current collector terminal is pushed toward the electrode body side.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a sectional view taken along line A-A in FIG. 2B;

FIG. 3B is a sectional view taken along line B-B in FIG. 2B;

FIG. 4A is a schematic plan view illustrating a battery of the related art;

FIG. 4B is a schematic sectional view illustrating the battery of the related art;

FIG. 5A is a schematic plan view illustrating the battery in the present disclosure;

FIG. 5B is a schematic sectional view illustrating the battery in the present disclosure;

DETAILED DESCRIPTION OF EMBODIMENTS

Hereinafter, a battery in the present disclosure will be described in detail with reference to the drawings. Each drawing shown below is schematically shown, and the size and shape of each part are appropriately exaggerated for easy understanding. Moreover, hatching of each part may be omitted as appropriate.

Figure 1:
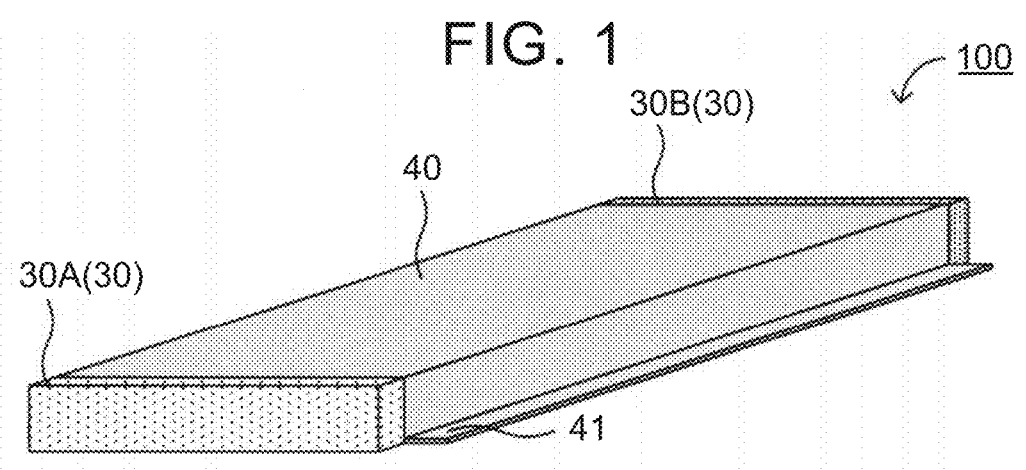
FIG. 1 is a schematic perspective view illustrating a battery in the present disclosure.
Figure 2A:
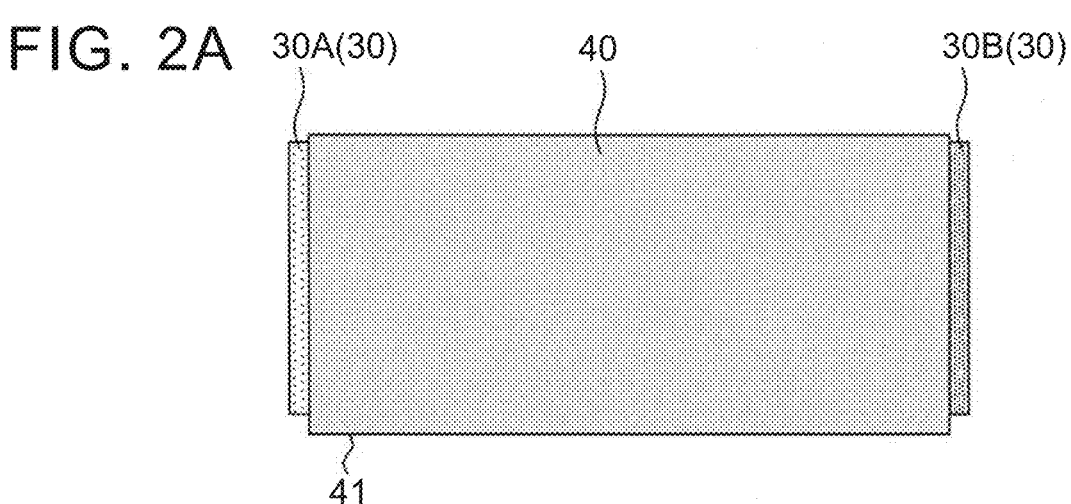
FIG. 2A is a schematic plan view illustrating the battery in the present disclosure.
Figure 2B:
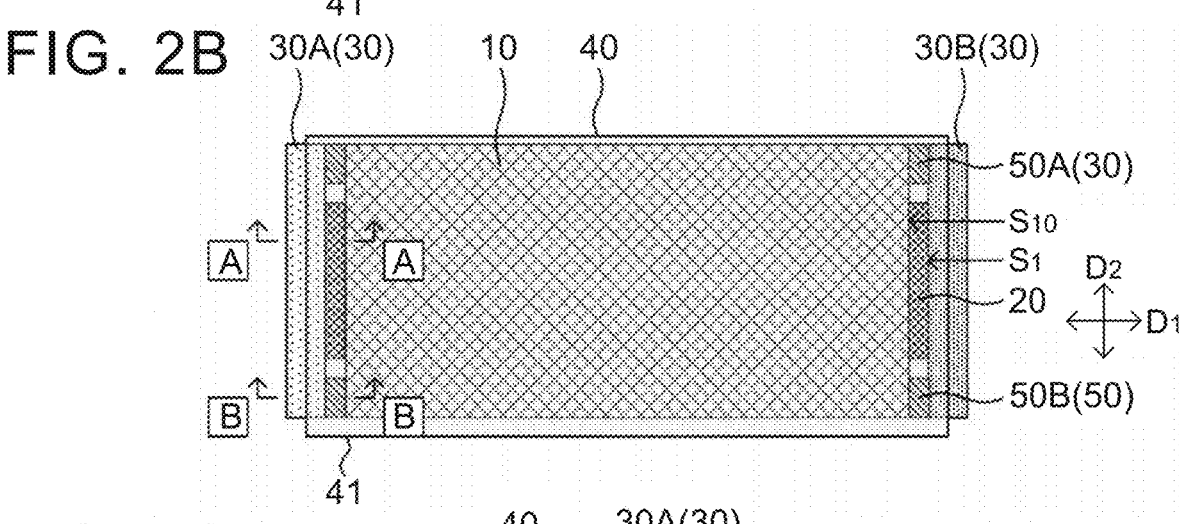
FIG. 2B is a schematic plan view illustrating the battery in the present disclosure.
Figure 2C:
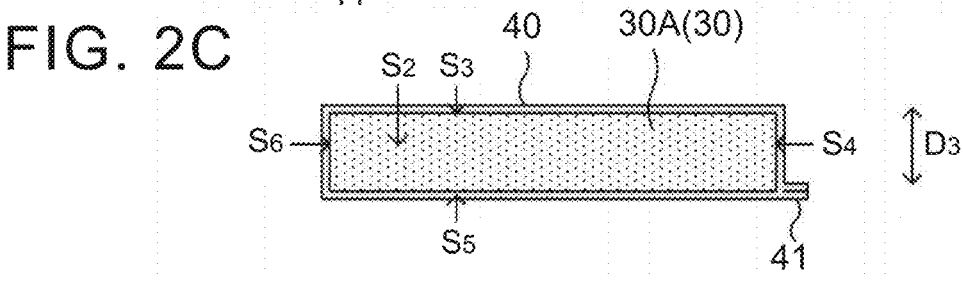
FIG. 2C is a schematic side view illustrating the battery in the present disclosure.

FIG. 1 is a schematic perspective view illustrating the battery in the present disclosure. FIGS. 2A and 2B are each a schematic plan view illustrating the battery in the present disclosure, and FIG. 2C is a schematic side view illustrating the battery in the present disclosure. As shown in FIG. 1 and FIGS. 2A, 2B, and 2C, the battery 100 includes an electrode body 10, a plurality of current collector tabs 20 extending from a side surface portion $S_{10}$ of the electrode body 10, current collector terminals 30 (first current collector terminal 30A and second current collector terminal 30B) connected to the current collector tabs 20, and a laminate film 40 housing the electrode body 10 and the current collector tabs 20.

FIG. 3A is a sectional view taken along line A-A in FIG. 2B, and FIG. 3B is a sectional view taken along line B-B in FIG. 2B. As shown in FIG. 3A, each of the current collector tabs 20 includes a root portion X that is an end portion on the electrode body 10 side, a connection portion Y for connecting to the current collector terminal 30, and an intermediate portion Z that connects the root portion X and the connection portion Y. The current collector tabs 20 have a laminated connection portion W in which the respective connection portions Y of the current collector tabs 20 are laminated in the thickness direction (up-down direction in FIGS. 3A and 3B). The current collector terminal 30 includes an inner surface $S_1$ facing the side surface portion $S_{10}$ of the electrode body 10, an outer surface $S_2$ opposite to the inner surface $S_1$, and four side surfaces ($S_3$, $S_4$, $S_5$, $S_6$) arranged along the outer edge of the inner surface $S_1$. Note that the side surface $S_4$ and the side surface $S_6$ are not shown in FIG. 3A. As shown in FIG. 2C, the laminate film 40 is disposed on the four side surfaces $S_3$ to $S_6$. As shown in FIG. 3A, the main surface of the laminated connection portion W is joined to the inner surface $S_1$ of the current collector terminal 30. Further, as shown in FIG. 3B, a spacer member 50 is disposed between the inner surface $S_1$ of the current collector terminal 30 and the side surface portion $S_{10}$ of the electrode body 10.

According to the present disclosure, by using a current collector terminal having a predetermined inner surface, and a spacer member, a battery in which, even when a load is applied to the battery in a direction in which the current collector terminal is pushed toward the electrode body side, the laminate film is less likely to be damaged is provided. Here, FIG. 4A is a schematic plan view illustrating a battery of the related art, and FIG. 4B is a sectional view taken along line A-A in FIG. 4A. FIG. 5A is a schematic plan view illustrating the battery in the present disclosure, and FIG. 5B is a sectional view taken along line A-A in FIG. 5A. As shown in FIGS. 4A and 4B, in the battery of the related art, when a load is applied to the battery in the direction (black arrow) in which the current collector terminal 30 is pushed toward the electrode body 10 side, the laminate film 40 is likely to be damaged. The reason is that the rigidity of the current collector terminal 30 is high and the rigidity of the current collector tabs 20 and the laminate film 40 are low in the load direction. On the other hand, as shown in FIGS. 5A and 5B, in the present disclosure, the current collector terminal 30 having the inner surface $S_1$ with which the main surface of the laminated connection portion W can be in surface contact is used. Further, the spacer member is disposed between the inner surface $S_1$ of the current collector terminal 30 and the side surface portion $S_{10}$ of the electrode body 10. Therefore, even when a load is applied to the battery in the direction (black arrow) in which the current collector terminal 30 is pushed toward the electrode body 10 side, the presence of the spacer member 50 suppresses deformation due to the load, and bending of the inner surface $S_1$ that is large in area results in dispersion of stress caused by the load. In particular, as will be described later, when the current collector tabs 20 have a curved structure, the current collector tabs 20 bend at the same time as the current collector terminal 30 bends, and the stress caused by the load is therefore further dispersed. Therefore, even when the load is applied to the battery in the direction in which the current collector terminal is pushed toward the electrode body side, a battery in which the laminate film is less likely to be damaged is provided.

1. Battery Configuration

The battery in the present disclosure includes the electrode body, the current collector tabs extending from the side surface portion of the electrode body, the current collector terminals connected to the current collector tabs, and the laminate film housing the electrode body and the current collector tabs. Furthermore, the battery in the present disclosure includes the spacer member between the inner surface of the current collector terminal and the side surface portion of the electrode body.

(1) Electrode Body

The electrode body in the present disclosure includes a power generation unit generally having a positive electrode current collector, a positive electrode active material layer, an electrolyte layer, a negative electrode active material layer, and a negative electrode current collector in this order in the thickness direction. Although the shape of the electrode body is not particularly limited, having, for example, a top surface portion, a bottom surface portion opposite to the top surface portion, and four side surface portions connecting the top surface portion and the bottom surface portion is desirable. The shape of the top surface portion is not particularly limited, but examples thereof include quadrilaterals such as squares, rectangles, rhombuses, trapezoids, and parallelograms. The shape of the top surface portion may be a polygonal shape other than a quadrilateral, or may be a shape having a curve such as a circular shape. Also, the shape of the bottom surface portion is the same as the shape of the top surface portion. The shape of the side surface portion is not particularly limited, but examples thereof include quadrilaterals such as squares, rectangles, rhombuses, trapezoids, and parallelograms.

(2) Current Collector Tabs

The current collector tabs in the present disclosure are arranged so as to extend from the side surface portion of the electrode body. The term "side surface portion of the electrode body" refers to a portion that constitutes the electrode body and the normal direction of which intersects the laminating direction of the electrode body. For example, in FIG. 3A, the normal direction (up-down direction in the drawing) of the side surface portion $S_{10}$ of the electrode body 10 is orthogonal to the laminating direction (right-left direction in the drawing) of the electrode body 10. Further, the "laminating direction of the electrode body" refers to the thickness direction of each layer constituting the electrode body.

As shown in FIG. 3A, each of the current collector tabs 20 includes the root portion X that is the end portion on the electrode body 10 side, the connection portion Y for connecting to the current collector terminal 30, and the intermediate portion Z that connects the root portion X and the connection portion Y. The root portion X is an end portion (boundary portion) of the current collector tab 20 on the electrode body 10 side. The connection portion Y is a portion for connecting to the current collector terminal 30, and is a portion that constitutes a laminated connection portion W, which will be described later. The intermediate portion Z is a portion connecting the root portion X and the connection portion Y. In the present disclosure, the current collector tabs have a laminated connection portion in which the respective connection portions of the current collector tabs are laminated in the thickness direction. In FIG. 3A, the respective connection portions Y of the current collector tabs 20 are laminated in the thickness direction of the current collector tab 20, thereby forming the laminated connection portion W. In the laminated connection portion W, the connection portions Y are joined to each other (fixed to each other).

As shown in FIG. 3A, in a sectional view in the laminating direction of the electrode body 10, it is desirable that the intermediate portion Z has a curved structure (area indicated by a broken line) in which the intermediate portion Z is curved such that parts of the intermediate portion Z face each other. In FIG. 3A, the intermediate portion Z of a rightmost current collector tab 20 among the current collector tabs 20 does not have the curved structure because the parts of the intermediate portion Z do not face each other, whereas the intermediate portions Z of the other current collector tabs 20 all have the curved structure. In this manner, it is desirable that the intermediate portion Z of at least one current collector tab 20 among the current collector tabs 20 has the curved structure. In the curved structure, parts of the intermediate portion Z facing each other may be arranged so as to be in direct contact with each other, or may be arranged with a space therebetween. As shown in FIGS.

3A and 3B, it is desirable that the intermediate portions Z of the current collector tabs 20 are curved in a U-shape.

(3) Current Collector Terminal

The current collector terminal in the present disclosure has the inner surface facing the side surface portion of the electrode body, and the side surface disposed along the outer edge of the inner surface. The shape of the inner surface is not particularly limited, but examples thereof include quadrilaterals such as squares, rectangles, rhombuses, trapezoids, and parallelograms. The number of the side surfaces is, for example, plural. Also, the number of the side surfaces depends, for example, on the shape of the outer edge of the inner surface. For example, when the shape of the outer edge of the inner surface is a quadrilateral, the current collector terminal may have four side surfaces. Also, the current collector terminal may have an outer surface opposite to the inner surface. The inner surface generally corresponds to a surface within an area sealed with the laminate film. The outer surface generally corresponds to a surface outside the area sealed with the laminate film. The inner surface, the side surface, and the outer surface may each be flat or curved.

Figure 6:
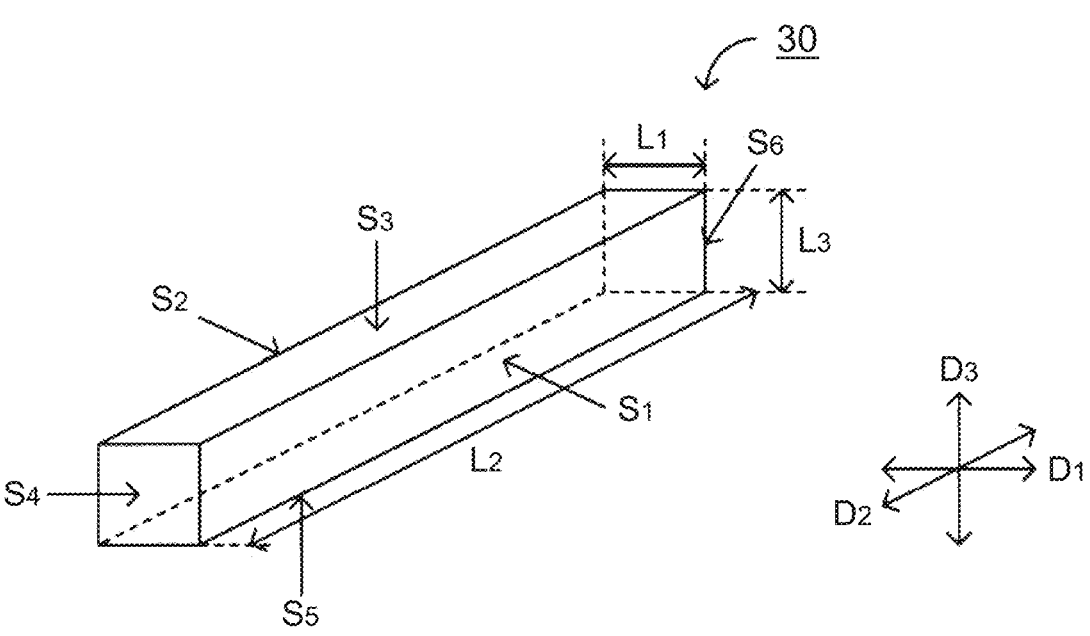
FIG. 6 is a schematic perspective view illustrating a current collector terminal in the present disclosure.

As shown in FIG. 6, the current collector terminal 30 may include an inner surface $S_1$, an outer surface $S_2$ opposite to the inner surface $S_1$, and four side surfaces ($S_3$, $S_4$, $S_5$, $S_6$) arranged along the outer edge of the inner surface $S_1$. As shown in FIG. 2B, a direction in which the electrode body 10 and the current collector terminal 30 face each other is $D_1$, and a direction orthogonal to the direction $D_1$ is $D_2$. Also, as shown in FIG. 2C, a direction orthogonal to both directions $D_1$ and $D_2$ is $D_3$. The direction $D_3$ generally coincides with the laminating direction $D_L$ of the electrode body 10. As shown in FIG. 6, the length of the current collector terminal 30 in the direction $D_1$ is $L_1$, the length of the current collector terminal 30 in the direction $D_2$ is $L_2$, and the length of the current collector terminal 30 in the direction $D_3$ is $L_3$. $L_2$ may be greater than $L_1$. The ratio of $L_2$ to $L_1$ ($L_2/L_1$) is, for example, two or more, and may be five or more, or may be 10 or more. $L_2$ may be greater than $L_3$. The ratio of $L_2$ to $L_3$ ($L_2/L_3$) is, for example, five or more, and may be 10 or more, or may be 50 or more. $L_1$ may be greater than $L_3$. The ratio of $L_1$ to $L_3$ ($L_1/L_3$) is, for example, two or more, and may be five or more, or may be 10 or more.

Although not particularly shown, the length of the electrode body in the direction $D_1$ is $L_X$, the length of the electrode body in the direction $D_2$ is $L_Y$, and the length of the electrode body in the direction $D_3$ is $L_Z$. The ratio of $L_1$ to $L_X$ ($L_1/L_X$) is not particularly limited. The ratio of $L_2$ to $L_Y$ ($L_2/L_Y$) is, for example, 0.8 or more, and may be 0.9 or more, or may be 0.95 or more. $L_2/L_Y$ is, for example, 1.0 or less. The ratio of $L_3$ to $L_Z$ ($L_3/L_Z$) is, for example, 0.8 or more, and may be 0.9 or more, or may be 0.95 or more. $L_3/L_Z$ is, for 5 example, 1.0 or less.

When the battery is viewed from the current collector terminal side in side view, the inner surface of the current collector terminal and the side surface portion of the electrode body are arranged so as to overlap each other. An area where the inner surface of the current collector terminal and the side surface portion of the electrode body overlap is referred to as an overlapping area. The ratio of the area $S_B$ of the overlapping area to the area $S_A$ of the side surface portion of the electrode body ($S_B/S_A$) is, for example, 80% or more, and may be 90% or more, or may be 95% or more. On the other hand, $S_B/S_A$ is 100% or less.

As shown in FIG. 3A, the main surface of the laminated connection portion W is joined to the inner surface $S_1$ of the current collector terminal 30. The term "main surface of the laminated connection portion W" refers to a surface that constitutes the laminated connection portion W and the normal direction of which coincides with the thickness direction of the connection portion Y. The main surface of the laminated connection portion W may be directly in contact with and joined to the inner surface $S_1$, or may be joined via another member (for example, a conductive layer). The inner surface $S_1$ of the current collector terminal 30 and the laminated connection portion W are generally joined to each other (fixed to each other).

(4) Spacer Member

The spacer member in the present disclosure is disposed between the inner surface of the current collector terminal and the side surface portion of the electrode body. The battery in the present disclosure may include one spacer member or a plurality of spacer members for one current collector terminal. Moreover, it is desirable that the spacer member is in surface contact with the inner surface of the current collector terminal. In the same manner, it is desirable that the spacer member is in surface contact with the side surface portion of the electrode body.

Figure 7A:
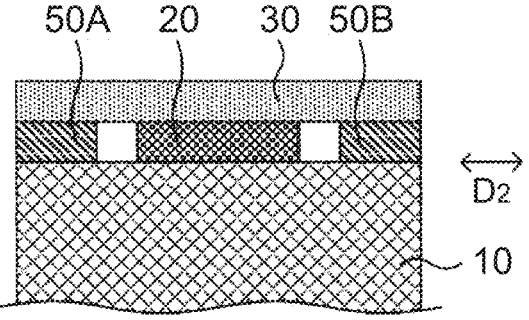
FIG. 7A is a schematic plan view illustrating a spacer member in the present disclosure.

FIGS. 7A, 7B, 7C, and 7D are each a schematic plan view illustrating spacer members in the present disclosure. As shown in FIG. 7A, in plan view in the laminating direction of the electrode body 10, current collector tabs 20 are arranged between a first spacer member 50A and a second spacer member 50B. In this case, when a load is generated in the direction in which the current collector terminal is pushed toward the electrode body side, the stress is likely to be dispersed. As shown in FIG. 7A, spaces may be provided between the spacer member 50 and the current collector tabs 20. In this case, even when the current collector tabs 20 are deformed due to the load, the current collector tabs 20 can be suppressed from coming into contact with the spacer member 50, and the current collector tabs 20 can be suppressed from being damaged. Further, as shown in FIG. 7A, the electrode body 10 and the spacer member 50 may be flush with each other in the direction $D_2$ orthogonal to the direction in which the electrode body 10 and the current collector terminal 30 face each other. In this case, when the electrode body is covered with the laminate film, it is possible to suppress the occurrence of wrinkles in the laminate film.

Figure 7B:
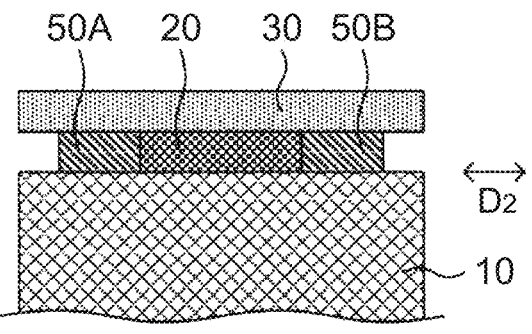
FIG. 7B is a schematic plan view illustrating the spacer member in the present disclosure.
Figure 7C:
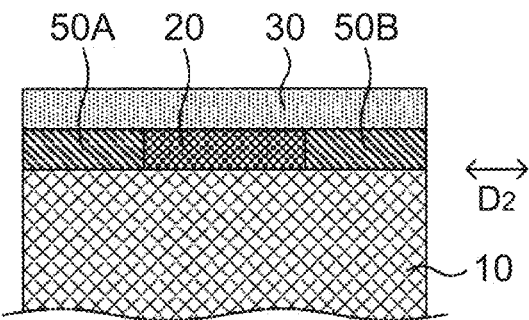
FIG. 7C is a schematic plan view illustrating the spacer member in the present disclosure.
Figure 7D:
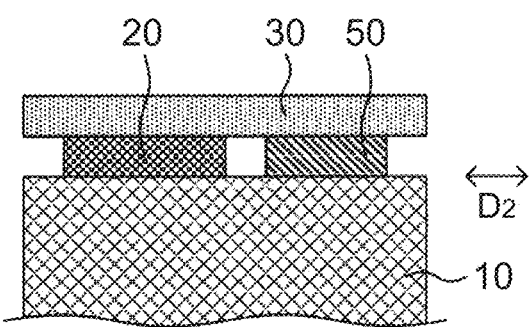
FIG. 7D is a schematic plan view illustrating the spacer member in the present disclosure.

As shown in FIG. 7B, the spacer member 50 and the current collector tabs 20 may be in direct contact. In this case, by firmly fixing the current collector tabs 20, deformation of the tabs due to the load can be suppressed. Furthermore, the spacer member 50 may be disposed at a position (for example, a position inside the U-shape of the curved structure shown in FIG. 3A) overlapping with the current collector tabs 20. Further, as shown in FIG. 7B, the electrode body 10 may protrude with respect to the spacer member 50 in the direction $D_2$ orthogonal to the direction in which the electrode body 10 and the current collector terminal 30 face each other. As shown in FIG. 7C, the spacer member 50 and the current collector tabs 20 may be in direct contact, and furthermore, in the direction $D_2$, the electrode body 10 and the spacer member 50 may be flush with each other. Also, as shown in FIG. 7D, the battery may include one spacer member 50 for one current collector terminal 30.

Figure 8A:
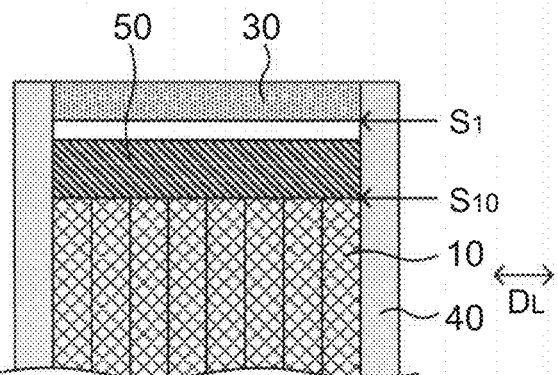
FIG. 8A is a schematic sectional view illustrating the spacer member in the present disclosure.
Figure 8C:
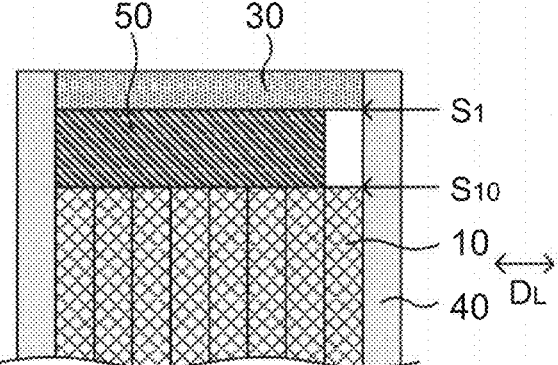
FIG. 8C is a schematic sectional view illustrating the spacer member in the present disclosure.
Figure 8B:
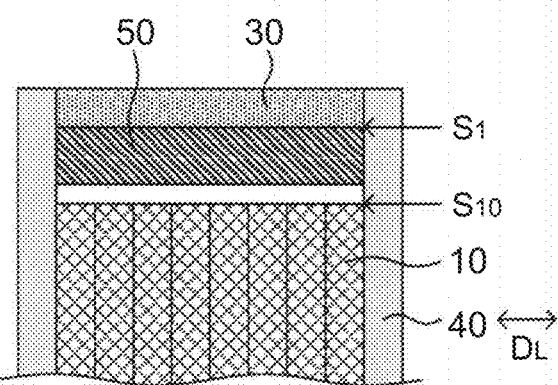
FIG. 8B is a schematic sectional view illustrating the spacer member in the present disclosure.

FIGS. 8A, 8B, 8C, and 8D are each a schematic sectional view illustrating spacer members in the present disclosure. As shown in FIG. 8A, in a sectional view in the laminating direction of the electrode body 10, the spacer member 50 may be in contact with the side surface portion $S_{10}$ of the electrode body 10. In FIG. 8A, a space is provided between the inner surface $S_1$ of the current collector terminal 30 and the spacer member 50. As shown in FIG. 8B, in a sectional view in the laminating direction of the electrode body 10, the spacer member 50 may be in contact with the inner surface $S_1$ of the current collector terminal 30. In FIG. 8B, a space is provided between the side surface portion $S_{10}$ of the electrode body 10 and the spacer member 50. As shown in FIG. 3B described above, the spacer member 50 may be in contact with the inner surface $S_1$ of the current collector terminal 30 and may also be in contact with the side surface portion $S_{10}$ of the electrode body 10.

Figure 8D:
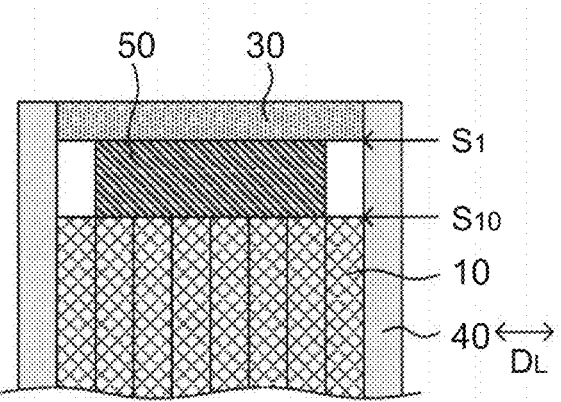
FIG. 8D is a schematic sectional view illustrating the spacer member in the present disclosure.

As shown in FIG. 8C, in the laminating direction $D_L$ of the electrode body 10, the spacer member 50 may be in contact with only one of the laminate films 40 facing each other. As shown in FIG. 8D, in the laminating direction $D_L$ of the electrode body 10, the spacer member 50 may be in contact with neither of the laminate films 40 facing each other. Moreover, as shown in FIG. 3B described above, the spacer member 50 may be in contact with both of the laminate films 40 facing each other.

(5) Laminate Film

The laminate film in the present disclosure houses the electrode body and the current collector tabs. In FIG. 2B, the laminate film 40 covers the electrode body 10, the current collector tabs 20, and the spacer member 50. As shown in FIGS. 2B and 2C, the laminate film 40 partially covers the side surfaces $S_3$ to $S_6$ of the current collector terminal 30. As shown in FIG. 2C, the laminate film 40 is disposed on each of the side surfaces $S_3$ to $S_6$. Each side surface and the laminate film may be in direct contact with each other, or may be disposed via another member (for example, a resin layer that improves adhesion). On the other hand, as shown in FIG. 1, along the direction $D_1$ in which the electrode body 10 and the current collector terminal 30 face each other, a seal portion 41 in which the laminate films 40 are fused to each other is disposed.

2. Member of Battery

The battery in the present disclosure includes at least the electrode body, the current collector tab, the current collector terminal, the spacer member, and the laminate film.

The electrode body in the present disclosure includes the power generation unit generally having the positive electrode current collector, the positive electrode active material layer, the electrolyte layer, the negative electrode active material layer, and the negative electrode current collector in this order in the thickness direction. The electrode body generally has multiple power generation units laminated in the thickness direction. For example, the electrode body 10 shown in FIG. 9 includes the power generation units U laminated in the thickness direction (direction $D_3$). Each power generation unit U has the positive electrode current collector 4, the positive electrode active material layer 1, the electrolyte layer 3, the negative electrode active material layer 2, and the negative electrode current collector 5 in this order in the thickness direction (direction $D_3$). Adjacent power generation units U share one negative electrode current collector 5.

The positive electrode active material layer contains at least a positive electrode active material. The positive electrode active material layer may further contain at least one of a conductive material, an electrolyte and a binder. Examples of the positive electrode active material include oxide active material such as $LiNi_{1/3}Co_{1/3}Mn_{1/3}O_2$. Examples of the conductive material include carbon material. The electrolyte may be a solid electrolyte or a liquid electrolyte (electrolyte solution). The solid electrolyte may be an organic solid electrolyte such as a gel electrolyte, or an inorganic solid electrolyte such as an oxide solid electrolyte or a sulfide solid electrolyte. Examples of the binder include a rubber-based binder and a fluoride-based binder.

The negative electrode active material layer contains at least a negative electrode active material. The negative electrode active material layer may further contain at least one of a conductive material, an electrolyte and a binder. Examples of the negative electrode active material include metal active material such as Li and Si, carbon active material such as graphite, and oxide active material such as $Li_4Ti_5O_{12}$. The conductive material, the electrolyte and the binder are similar to those described above. The electrolyte layer is disposed between the positive electrode active material layer and the negative electrode active material layer and contains at least an electrolyte. The electrolyte may be a solid electrolyte or a liquid electrolyte. The electrolyte is similar to those described above. The electrolyte layer may have a separator.

The positive electrode current collector collects current from the positive electrode active material layer. Examples of the material of the positive electrode current collector include metals such as aluminum, SUS, and nickel. Examples of the shape of the positive electrode current collector include a foil shape. The negative electrode current collector collects current from the negative electrode active material layer. Examples of the material of the negative electrode current collector include metals such as copper, SUS, and nickel. Examples of the shape of the negative electrode current collector include a foil shape.

Figure 9:
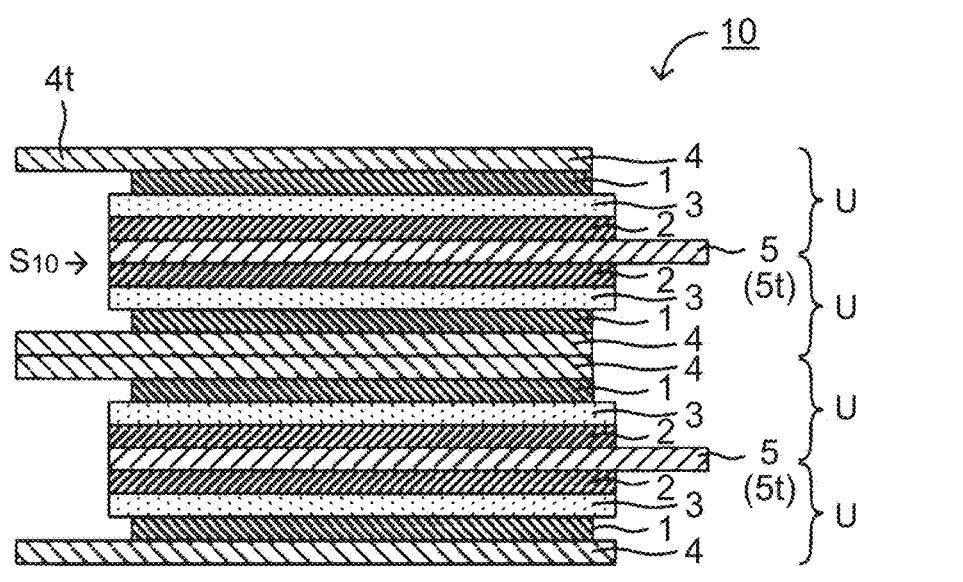
FIG. 9 is a schematic sectional view illustrating an electrode body in the present disclosure.
Figure 9:
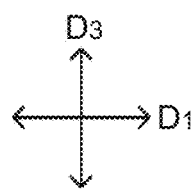

The battery in the present disclosure includes a positive electrode tab and a negative electrode tab as current collector tabs. As shown in FIG. 9, the positive electrode tab 4t extends from the side surface portion $S_{10}$ of the electrode body 10 in a direction intersecting with the laminating direction (direction $D_3$) of the electrode body 10. Further, as shown in FIG. 9, the positive electrode tab 4t may be formed continuously from the positive electrode active material layer 1. When viewed from the laminating direction (direction $D_3$) of the electrode body 10, the positive electrode tab 4t is disposed at a position where the positive electrode tab 4t does not overlap with the positive electrode active material layer 1. Further, in FIG. 9, the negative electrode tab 5t extends from the side surface portion of the electrode body 10 in a direction intersecting with the laminating direction (direction $D_3$) of the electrode body 10. Since the details of the negative electrode tab are similar to those of the positive electrode tab, description thereof is omitted here. As shown in FIG. 9, the positive electrode tab 4t may extend from one of the side surface portions of the electrode body 10, and the negative electrode tab 5t may extend from the other one of the side surface portions of the electrode body 10 (double-side tab structure). On the other hand, although not particularly shown, the positive electrode tab and the negative electrode tab may extend from the same side surface portion of the electrode body (single-side tab structure).

The current collector terminal in the present disclosure is electrically connected to the current collector tab in the electrode body. Examples of the shape of the current collector terminal include a plate shape. Further, examples of the material of the current collector terminal include metals such as Al and SUS.

The spacer member in the present disclosure is disposed between the inner surface of the current collector terminal and the side surface portion of the electrode body. Examples of the spacer member include a resin member, a rubber member, a metal member, a glass member, and a ceramic member. Examples of a resin used for the resin member include polyolefin such as polyethylene and polypropylene, and polyimide. The spacer member may have insulating properties or may have electrical conductivity. In the latter case, it is desirable that an insulating member is disposed between the spacer member and the side surface portion of the electrode body.

The laminate film in the present disclosure has at least a structure in which a heat-fusion layer and a metal layer are laminated. Moreover, the laminate film may have the heat-fusion layer, the metal layer and a resin layer in this order along the thickness direction. Examples of the material of the heat-fusion layer include an olefin-based resin such as polypropylene (PP) and polyethylene (PE). Examples of the material of the metal layer include aluminum, aluminum alloy, and stainless steel. Examples of the material of the resin layer include polyethylene terephthalate (PET) and nylon. The thickness of the heat-fusion layer is, for example, 40 μm or more and 100 μm or less. The thickness of the metal layer is, for example, 30 μm or more and 60 μm or less. The thickness of the resin layer is, for example, 20 μm or more and 60 μm or less. The thickness of the laminate film is, for example, 80 μm or more and 250 μm or less.

The battery in the present disclosure is typically a lithium ion secondary battery. Applications of the battery include, for example, a power source for vehicles such as hybrid electric vehicles (HEVs), plug-in hybrid electric vehicles (PHEVs), battery electric vehicles (BEVs), gasoline vehicles, and diesel vehicles. In particular, it is desirable that the battery is used as a drive power source for hybrid electric vehicles (HEVs), plug-in hybrid electric vehicles (PHEVs), or battery electric vehicles (BEVs). Also, the battery in the present disclosure may be used as a power source for mobile bodies other than vehicles (for example, railroads, ships, and aircraft), and may be used as a power source for electric products such as an information processing device.

3. Method for Manufacturing Battery

Figure 10A:
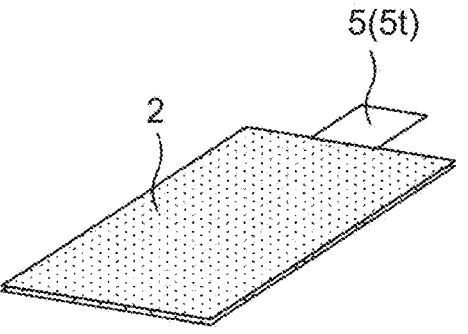
FIG. 10A is a schematic perspective view illustrating a method for manufacturing the battery in the present disclosure.
Figure 10D:
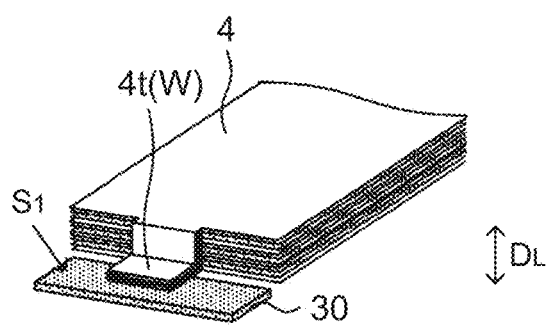
FIG. 10D is a schematic perspective view illustrating the method for manufacturing the battery in the present disclosure.
Figure 10B:
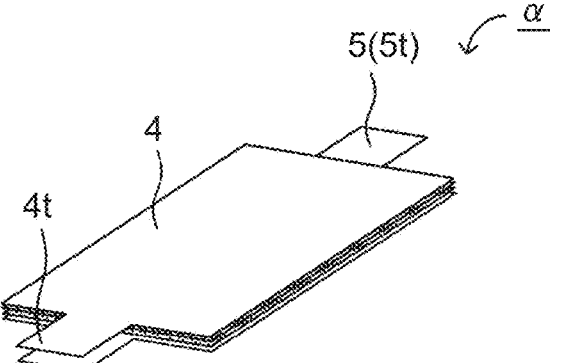
FIG. 10B is a schematic perspective view illustrating the method for manufacturing the battery in the present disclosure.

A method for manufacturing the battery in the present disclosure is not particularly limited as long as it is a method capable of manufacturing the battery described above. FIGS. 10A, 10B, 10C, 10D, 10E, and 10F are schematic perspective views illustrating the method for manufacturing the battery in the present disclosure. First, as shown in FIG. 10A, the negative electrode active material layers 2 are formed on opposite sides of the negative electrode current collector 5. Examples of the method for forming the negative electrode active material layer include a method of applying a slurry containing the material of the negative electrode active material layer onto the negative electrode current collector and drying the slurry. Next, as shown in FIG. 10B, an electrolyte layer (not shown), a positive electrode active material layer (not shown), and a positive electrode current collector 4 are arranged on each of the two negative electrode active material layers 2 to obtain a laminated body α.

Figure 10E:
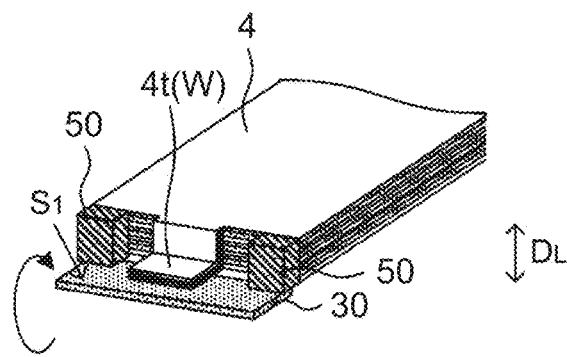
FIG. 10E is a schematic perspective view illustrating the method for manufacturing the battery in the present disclosure.
Figure 10C:
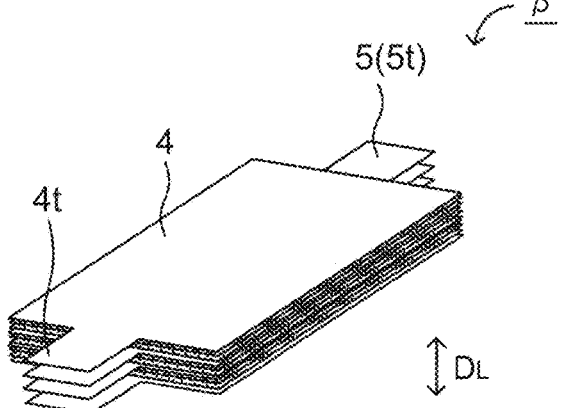
FIG. 10C is a schematic perspective view illustrating the method for manufacturing the battery in the present disclosure.
Figure 10F:
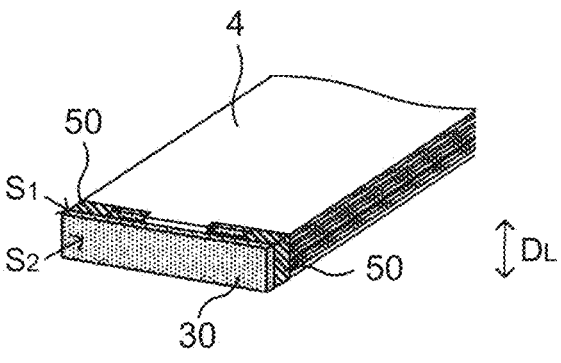
FIG. 10F is a schematic perspective view illustrating the method for manufacturing the battery in the present disclosure.

After that, as shown in FIG. 10C, multiple laminated bodies α are laminated in the laminating direction $D_L$ to produce a laminated body β. Next, as shown in FIG. 10D, the tips of the positive electrode tabs 4t are joined together to produce a laminated connection portion W, and the main surface of the laminated connection portion W is joined to the inner surface $S_1$ of the current collector terminal 30. Examples of the method for producing the laminated connection portion W include a method using welding such as laser welding and electron beam welding, a method using conductive paste, and a method using solder. The method for joining the main surface of the laminated connection portion W and the inner surface $S_1$ of the current collector terminal 30 is also the same as the method for producing the laminated connection portion W. Next, as shown in FIG. 10E, the spacer member 50 is disposed on the side surface portion of the electrode body. Next, as shown in FIG. 10F, the current collector terminal 30 is rotated so that the normal direction of the inner surface $S_1$ and the outer surface $S_2$ of the current collector terminal 30 is orthogonal to the laminating direction $D_L$. After that, the negative electrode tab (not shown) is also subjected to the same treatment, and the obtained member is covered with a sheet of laminate film so that a part of the two current collector terminals facing each other (at least, the outer surface of each of the current collector terminals) is exposed, to thereby obtain a battery.

The present disclosure is not limited to the above embodiments. The above embodiments are illustrative, and anything having substantially the same configuration as, and having similar functions and effects to, the technical idea described in the claims of the present disclosure is included in the technical scope of the present disclosure.

What is claimed is:

1. A battery comprising:

an electrode body;

a plurality of current collector tabs extending from a side surface portion of the electrode body;

a current collector terminal connected to the current collector tabs;

a laminate film housing the electrode body and the current collector tabs; and a spacer member, wherein:

each of the current collector tabs includes a root portion that is an end portion on the electrode body side, a connection portion for connecting to the current collector terminal, and an intermediate portion connecting the root portion and the connection portion;

the current collector tabs include a laminated connection portion in which the respective connection portions of the current collector tabs are laminated in a thickness direction;

the current collector terminal includes an inner surface facing the side surface portion of the electrode body, and a side surface disposed along an outer edge of the inner surface;

the laminate film is disposed on the side surface of the current collector terminal;

a main surface of the laminated connection portion of the current collector tabs is joined to the inner surface of the current collector terminal;

the spacer member comprises a first spacer member and a second spacer member, each disposed in surface contact with the inner surface of the current collector terminal and the side surface portion of the electrode body; and with respect to a plan view in a laminating direction of the electrode body, the current collector tabs are arranged between the first spacer member and the second spacer member.

2. The battery according to claim 1, wherein, in a sectional view in the laminating direction of the electrode body, each of the intermediate portions include a curved structure such that parts of each intermediate portion face each other.

3. The battery according to claim 1, wherein the spacer member is a resin member.

4. The battery according to claim 1, wherein:

the current collector terminal has an outer surface that is opposite to the inner surface, and the side surface is between the inner surface and the outer surface; and the laminate film is only partially covering the side surface of the current collector terminal.

5. The battery according to claim 1, wherein the first spacer member and the second spacer member are disposed at either end of the side surface portion of the electrode body.

* * * * *